United States Patent [19]

Do-Thoi et al.

[11] Patent Number: 5,525,432
[45] Date of Patent: Jun. 11, 1996

[54] INTERNAL SOLDERING IN METAL/CERAMIC COMPOSITES

[75] Inventors: Tha Do-Thoi, Röthenbach/Pegnitz; Gerd Meier, Leinburg; Klaus Popp, Kalchreuth-Röckenhof; Peter Stingl, Lauf, all of Germany

[73] Assignee: Hoechst CeramTec Aktiengesellschaft, Selb, Germany

[21] Appl. No.: 258,075

[22] Filed: Jun. 10, 1994

[30] Foreign Application Priority Data

Jun. 12, 1993 [DE] Germany .................. 43 19 533.4

[51] Int. Cl.$^6$ ................. B23K 1/00; B23B 7/00
[52] U.S. Cl. ............... 428/627; 428/632; 428/674; 428/673; 428/675; 228/122.1; 228/124.1
[58] Field of Search .................. 428/627, 632, 428/673, 674, 675, 680; 228/122.1, 124.1, 903

[56] References Cited

U.S. PATENT DOCUMENTS

| | | | |
|---|---|---|---|
| 3,137,545 | 6/1964 | Schultz | 29/195 |
| 3,507,979 | 4/1970 | Erkan | 228/122.1 |
| 4,562,121 | 12/1985 | Thiemann et al. | 428/673 |
| 4,988,034 | 1/1991 | Taniguchi et al. | 228/122.1 |
| 4,996,111 | 2/1991 | Do-Thoi et al. | 428/432 |
| 5,131,582 | 7/1992 | Kaplan et al. | 228/122.1 |
| 5,156,322 | 10/1992 | Do-Thoi et al. | 228/124 |
| 5,351,874 | 10/1994 | Rajner et al. | 228/124.1 |
| 5,387,441 | 2/1995 | Do-Thoi et al. | 427/443.2 |

FOREIGN PATENT DOCUMENTS

| | | | |
|---|---|---|---|
| 0356678 | 3/1990 | European Pat. Off. | |
| 681026 | 8/1979 | U.S.S.R. | 228/122.1 |
| WO92/00936 | 1/1992 | WIPO | |

OTHER PUBLICATIONS

Manko, "Solders and Soldering", pp. 1–7, 251–262, 1964 (no month).

Primary Examiner—Wayne Langel
Assistant Examiner—N. M. Nguyen
Attorney, Agent, or Firm—Foley & Lardner

[57] ABSTRACT

The invention relates to a composite body in which a ceramic component and a metal component are bonded to one another by internal soldering. The internal soldering is effected with soldering composition in a recess (2) within a component (1) of the one material in which there is arranged a component (3) of the other material which is shaped to fit accurately. The recess (2) is, at at least one end-face opening, surrounded by a chamfer (5) having an angle φ smaller than 35° C., while the wetting angle β between the soldering composition and the plane of the component surface in which the recess is located is smaller than 40°.

18 Claims, 2 Drawing Sheets

INTERNAL SOLDERING IN METAL/CERAMIC COMPOSITES

BACKGROUND OF THE INVENTION

1. Field of the Invention

The invention relates to a composite body in which a ceramic component is bonded to a metal component by internal soldering. The invention also relates to the process for producing the composite body and use thereof.

2. Description of Related Art

Ceramic is used in many industrial areas since this material is very hard, resistant to high temperatures, corrosion-resistant and electrically insulating. To be able to utilize the advantages both of metals and of ceramics, it is often necessary to produce metal/ceramic composites. Here, the mechanical, chemical and thermal stability of the bond between the ceramic and the metal becomes of key importance in deciding the industrial use of the composite.

As a result of the differences in material properties of the components to be joined, the bonding of ceramic parts to metals in principle poses great difficulties, in particular in the case of internal soldering in which a component of the one material, shaped to fit accurately, is meant to be arranged in a recess within a component of the other material and be durably and firmly fixed there by means of soldering composition under the action of heat. Owing to the differences in the material parameters of the two materials, such as modulus of elasticity, yield point $R_p$, Poisson's ratio ($v$) and particularly the linear coefficient of thermal expansion ($\alpha$), complex joint stresses occur in the composite under the soldering conditions, in particular at the material transitions ceramic/soldering composition or soldering composition/metal or ceramic/metal.

Even with the selection of materials having expansion properties matched as far as possible, for example $Al_2O_3$ ceramic in combination with FeNiCo alloys (®Vacon), thermally induced residual stresses still occur in the composite, which stresses cause premature failure on mechanical loading. It is assumed that the cause of this is the significantly higher coefficient of thermal expansion ($\alpha$) of the silver/copper soldering composition compared with $Al_2O_3$ and Vacon. Table 1 shows the material data at the solidification temperature of the solder (780° C.) taken from the literature and manufacturer's data.

TABLE 1

Material data for Vacon, $Al_2O_3$ and Ag/Cu soldering composition at 780° C.

| Material | $\alpha$ [·$10^{-6}$·$K^{-1}$] | Modulus of elasticity [·$10^5$ MPa] | $R_p$ [Mpa] | $v$ |
|---|---|---|---|---|
| Vacon FeNiCo alloy (Material no. 1,3981) | 8.3 | 1.3 | 100 | 0.3 |
| $Al_2O_3$ ceramic | 8.1 | 3.5 | –/– | 0.23 |
| Ag/Cu eutectic hard solder | 18.9 | 0.22 | 25 | 0.3 |

As a result of the thermally induced residual stresses, the bonding of the materials shown in the table may in some circumstances fail even during the cooling phase, without external loading, by crack formation in the brittle ceramic in the direct proximity of the material transitions.

SUMMARY OF THE INVENTION

It is an object of the present invention to provide a composite in which the thermal stresses between the ceramic and the soldering composition in internal soldering are minimized or, if possible, completely avoided and which can be produced free of cracks by internal soldering in a simple manner and under normal soldering conditions.

This object is achieved according to the invention by a composite body of the generic type specified in the introduction, the defining features of which are that the internal soldering is effected with a soldering composition in a recess within a component of one material in which there is arranged a component of the other material which is shaped to fit accurately, that the recess is, at at least one end-face opening, surrounded by a chamfer having an angle smaller than 35°, preferably smaller than 20°, and that the wetting angle β between the soldering composition and the plane of the component surface in which the recess is located is smaller than 40°, preferably smaller than 20°.

DETAILED DESCRIPTION OF PREFERRED EMBODIMENTS

Figure 1:
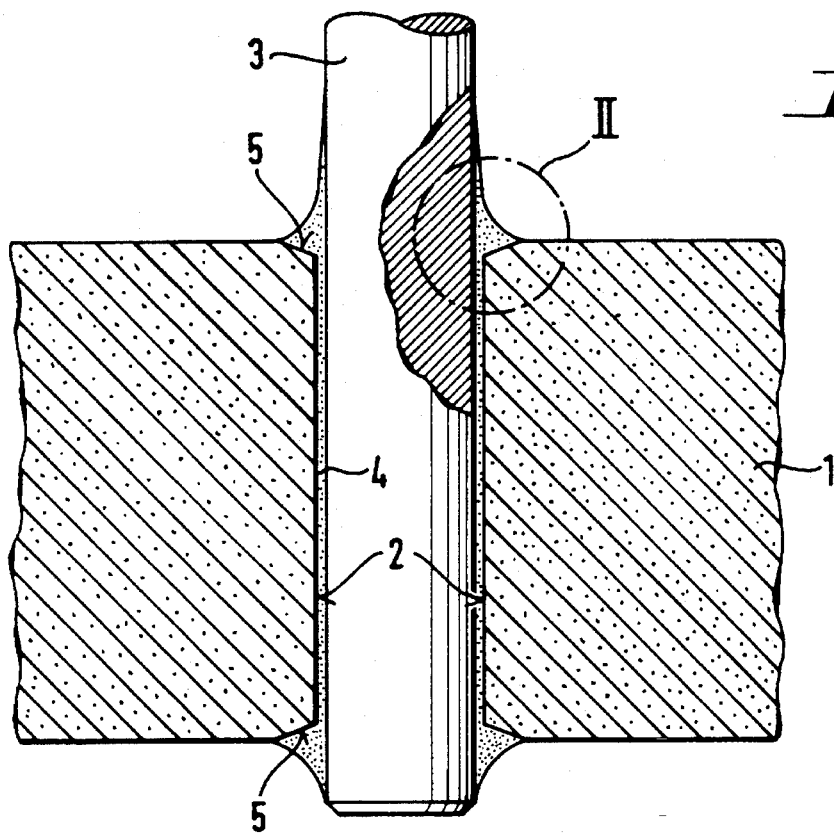
FIG. 1 shows a vertical longitudinal section of a composite body of metal and ceramic according the invention.

For the purposes of the present invention, suitable ceramic bodies are bodies comprising oxidic or nonoxidic ceramic. Suitable oxidic ceramics are primarily zirconium oxide and aluminum oxide, preferably $Al_2O_3$ ceramic bodies containing at least 80% by weight, preferably at least 94% by weight of $Al_2O_3$, while suitable nonoxidic ceramics are silicon carbide, silicon-infiltrated silicon carbide, silicon nitride or aluminum nitride.

The ceramic is metallized in the region of the contact surface of the recess and, if desired, also of the chamfer. The metallization is carried out by the known molybdenum/manganese or tungsten/titanium metallization process. The thin layer formed having a thickness in the range from 2 to 30 μm is fired in a humid, reducing atmosphere at temperatures of from 1200° C. to 1500° C. In this way, good adhesion between ceramic base material and metallization can be achieved. Subsequently, an additional nickel coating is applied electrolytically or chemically to the metallization layer. The nickel coating advantageously possesses a thickness in the range from about 0.5 to 5 μm and has the function of making the wetting of the metallized ceramic by the molten solder easier.

The bonding of metal to ceramic can be carried out not only by the abovementioned metallization process, but also using another bonding technique, for example soldering with active solders. In soldering with active solders, the metallization of the ceramic can be omitted. In contrast, in a conventional soldering process, solder materials based on silver/copper in the form of shaped pieces of solder or solder pastes are used. According to the invention, coatings of silver/copper solders having a copper content in the range from 10 to 80% by weight, preferably from 15 to 60% by weight, based on the total weight of silver and copper, or silver/copper solders containing one or more other elements such as Zn, Sn, Cd, Pd, Mn, Ni, Au, Si, In, Pt, Ti and Hf have proven most suitable in practice. Firing of the solder is preferably carried out in vacuo or under a protective gas atmosphere.

For the purposes of the present invention, the attribute of fitting accurately means that the external geometry of the component arranged in the recess is matched to the internal geometry of the recess. It can be cylindrical, conical, tube-shaped, cuboid-shaped or rod-shaped, or of other geometry and may or may not have a thickened region. The component advantageously projects to a depth of at least 1 mm into the recess, the region of the chamfer not being taken into account.

The application of the solder composition of copper and silver to the component which is arranged in the recess, is preferably carried out by the process according to EP-A-356 678. The application of the layers is preferably carried out by the electrolytic process, but other coating techniques are not excluded.

The thickness of the solder layer which corresponds to the solder gap is directly proportional to the diameter of the recess. For recesses having a particularly large diameter up to 15 mm, solder layers having a thickness of up to 100 µm, preferably less than 50 µm, and most preferably less than 25 µm, are advantageous, while for recesses having a smaller diameter of from 0.5 to 3 mm, solder layers and gap widths in the range from 20 to 50 µm have proven more suitable. Under soldering conditions, firmly adhering bonds are formed between the deposited solder layers and the metallization which is preferably present.

The coating process described ensures a uniform, constant thickness of the deposited layers on the component which is intended to be arranged in the recess. The soldering composition is preferably applied in excess, which does not mean that layers having a greater layer thickness are applied, but that the surface region of the component coated with soldering composition is larger than the region which is bonded to the interior wall of the recess of the other component by internal soldering. The excess soldering composition can penetrate into the gap between the two components during the heat treatment and, in particular in the region of the chamfer of the recess, form a build-up at which a wetting angle in the range of the invention is established. The temperature for the heat treatment is in the range from 600°–1300° C., preferably from 750°–850° C. The heat treatment can be carried out in vacuo or in a protective gas atmosphere.

Owing to the considerable differences in the coefficients of thermal expansion between ceramic and soldering composition, which can be seen in Table 1, the soldering composition contracts much more than the ceramic on cooling. This results in mechanical stresses at the ceramic/solder interface, particularly if the ceramic is used as the outer component, which stresses are greatest at the point where the solder filling the solder gap and the chamfer ends at the ceramic and there forms the wetting angle β between the surface of the soldering composition and the plane of the surface of the component within which the recess is arranged. This point is also called the point of attachment. Since the brittle ceramic, because of its poor plastic deformability, is not able to relieve stresses, cracks are formed in the ceramic. Investigations show that the point of attachment at the edge of the internal soldering is most unfavorable in the middle of the chamfer of the component in respect of excessive stress increases and associated crack formation.

In a further embodiment of the invention, not only the interior wall of the recess and the chamfer are metallized or wetted with soldering composition, but in the case of recesses which do not go right through, the internal end at the bottom of the recess is also metallized or wetted with soldering composition. This measure very largely avoids a transfer of the thermal stresses from the ductile solder into the brittle, fracture-sensitive ceramic.

In practice, this measure in the construction makes a large contribution to the production of crack-free metal/ceramic composites, even with rapid cooling.

EXAMPLE

A ceramic body of $Al_2O_3$ having a thickness of 3 mm is provided with a drilled hole going right through. The diameter of the drilled hole is 1 mm and it has a length of 3 mm. Both edges of the ceramic body adjoining the hole are provided with a 15° chamfer having a chamfer width of 0.4 mm which is rounded at the edge of the internal soldering, for example by subsequent abrasion. The interior wall of the drilled hole in the ceramic body is then metallized by conventional methods with $W/TiO_2$ and nickel (layer thickness of $W/TiO_2$: 10 µm, layer thickness of nickel: 1.8 µm) over its whole length including the chamfer. A round metal pin which is coated over its whole length with integrated solder comprising a copper/silver alloy having a copper content of 28% by weight and a silver content of 72% by weight (thickness of solder: 15 µm) is fitted into the drilled hole and precisely centered by means of the soldering jig. The soldering jig including the metallized ceramic and metal pin with integrated solder is heated in vacuo to a temperature between 810° and 830° C. At the soldering temperature, both metal and ceramic surfaces are wetted by the molten solder. The solder solidified after cooling forms a wetting angle of 30° and effects a firmly adhering and gastight or vacuumtight bond between the metal pin and the ceramic body. Polished sections show a crack-free metal/ceramic composite.

The bond thus produced was tested with a tensile tester and a pullout force of 350 N was measured (comparable with the tensile strength of the ®Vacon steel). Fracture did not occur at the soldering or bonding point, but in the metal pin itself.

The invention will now be illustrated more clearly to those skilled in the art with the aid of the attached drawings.

In FIG. 1, a ceramic material 1 which possesses a recess 2 going right through can be seen. Within the recess 2, a metal pin 3 is arranged so that it fits accurately and is bonded by internal soldering 4 to the ceramic material 1. In the magnified view of FIG. 2, the angle φ of the chamfer 5, the wetting angle β and the chamfer width b can be seen. The point of attachment 6 coincides with the outermost diameter of the chamfer 5 which is thus completely wetted with solder over its whole width b. By means of excess presoldering technology, the amount of excess solder provided 7 is such that the wetting angle β is thereby kept as small as possible. The solder cross section defined by the angle φ of the chamfer 5 and the wetting angle β transmits the forces of solder shrinkage into the ceramic body 1 homogeneously and over the area of the whole width b of the chamfer 5.

Figure 2:
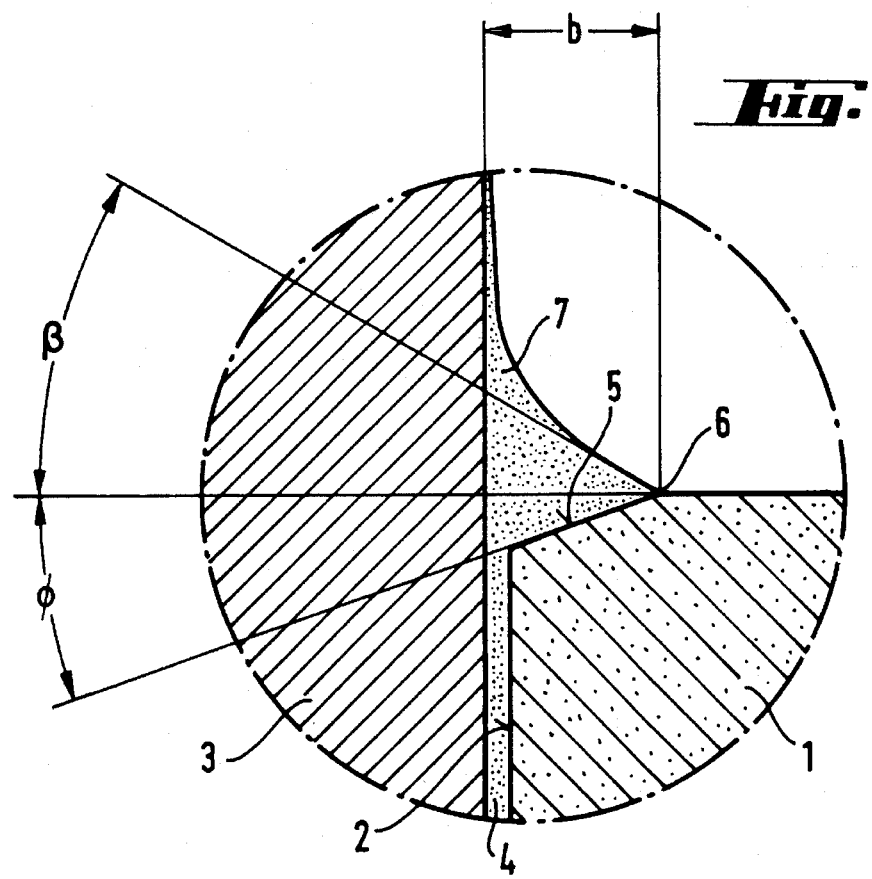
FIG. 2 shows a magnified view of the region II of FIG. 1.
Figure 3:
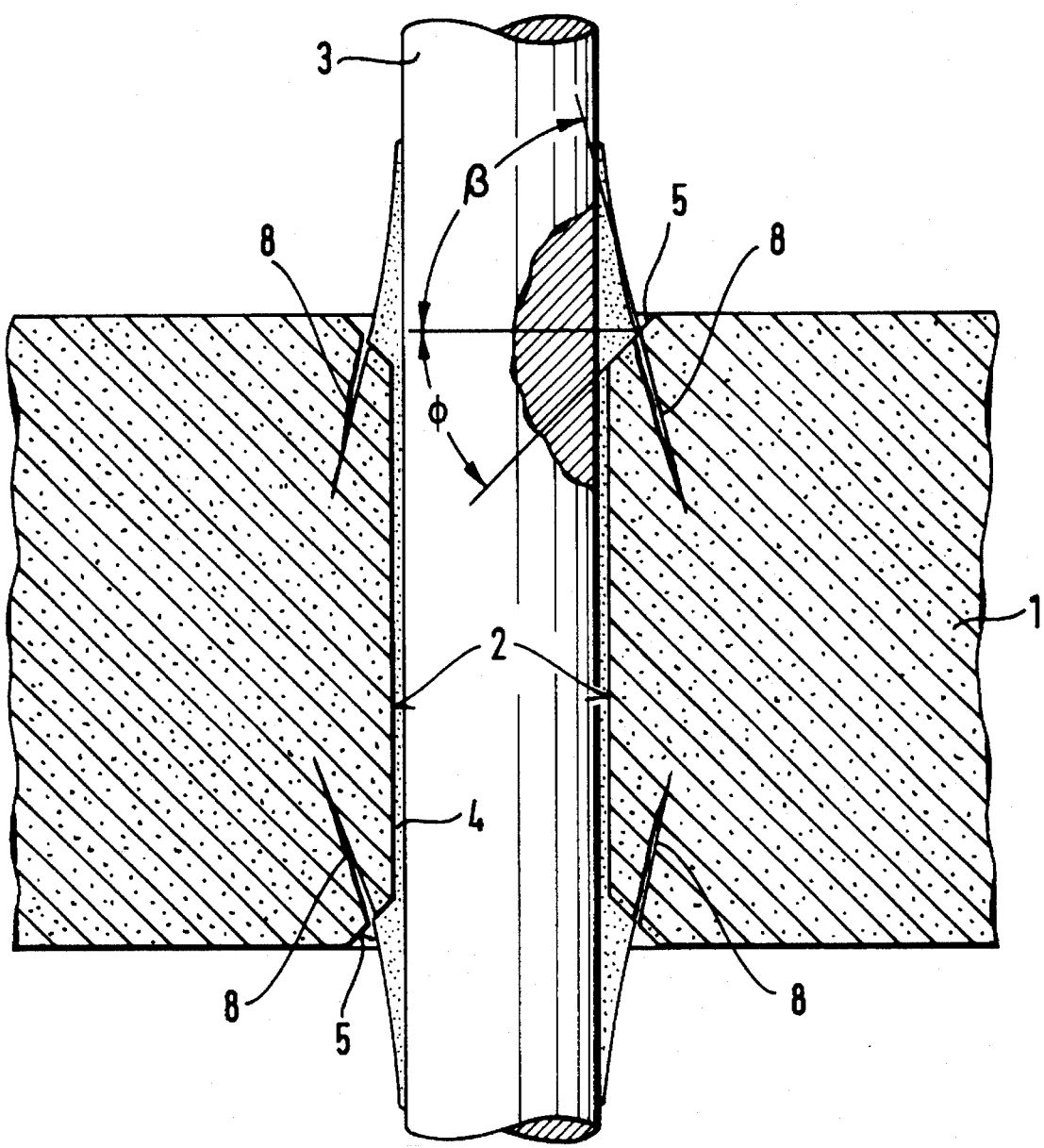
FIG. 3 shows a vertical longitudinal section of a composite body of metal and ceramic according to the prior art.

In FIG. 3, the reference labels have the same meanings as their equivalents in FIG. 1 and FIG. 2. However, it can be seen that the point of attachment 6 lies in the middle of the chamfer 5 and that the wetting angle β is too large, resulting in cracks 8 which make the composite body unusable.

The composite body of the invention can be advantageously used as a duct, rectifier housing, seal, sliding element, bearing element, piezoelectric element, pump piston, thyristor housing, overvoltage conductor, vacuum chamber, switching tube, ignition element, diode, rock top or spacer block for components subjected to chemical, mechanical and/or thermal stresses.

We claim:

1. A composite body comprising a ceramic component bonded to a metal component by internal soldering effected with a soldering composition in a recess within said ceramic component in which there is arranged said metal component which is shaped to fit accurately in said recess within said ceramic component, the recess is surrounded by a chamfer at at least one end-face opening, said chamfer having an angle smaller than 35° and a wetting angle β between the soldering composition and a plane of said ceramic component surface in which the recess is located is smaller than 40°.

2. A composite body as claimed in claim 1, wherein the angle of the chamfer is smaller than 20°.

3. A composite body as claimed in claim 1, wherein the wetting angle β is smaller than 20°.

4. A composite body as claimed in claim 1, wherein the ceramic component comprises zirconium oxide or aluminum oxide as oxidic ceramic.

5. A composite body as claimed in claim 4, wherein the aluminum oxide contains at least 80% by weight of $Al_2O_3$.

6. A composite body as claimed in claim 4 wherein the aluminum oxide contains at least 94% by weight of $Al_2O_3$.

7. A composite body as claimed in claim 1, wherein the ceramic component comprises a non-oxidic ceramic selected from the group consisting of SiC, silicon-infiltrated silicon carbide, $Si_3N_4$ and AlN.

8. A composite body as claimed in claim 1, wherein a ceramic component is provided with a recess and wherein a metallization layer is applied in the region of the contact surface of the recess.

9. A composite body as claimed in claim 8, wherein the metallization layer is applied also on the chamfer.

10. A composite body as claimed in claim 8, wherein the metallization layer is coated by an additional nickel coating having a thickness in the range from 0.5 to 5 μm.

11. A composite body as claimed in claim 1, wherein the soldering composition comprises a copper/silver alloy having a copper content in the range from 10 to 80% by weight, based on total weight of silver and copper, where one or more elements selected from the group consisting of Zn, Sn, Cd, Pd, Mn, Ni, Au, Si, In, Pt, Ti and Hf can be additionally present in the soldering composition.

12. A composite body as claimed in claim 11, wherein the silver/copper alloy has a copper content from 15 to 60% by weight.

13. A composite body as claimed in claim 1, prepared by accurately fitting said metal component which is coated with said soldering composition inside said recess within said ceramic component and thermally treating said metal component and ceramic component at a temperature within the range of from 600° to 1300° C.

14. A composite body as claimed in claim 13, wherein said thermal treatment takes place at a temperature of from 750° to 850° C.

15. A composite body as claimed in claim 13, wherein said thermal treatment takes place in vacuo or in a protective gas atmosphere.

16. A composite body as claimed in claim 13, wherein said soldering composition has a thickness of less than 100 μm.

17. A composite body as claimed in claim 16, wherein said soldering composition has a thickness of less than 50 μm.

18. A composite body as claimed in claim 16, wherein said soldering composition has a thickness of less than 25 μm.

* * * * *